UNITED STATES PATENT OFFICE.

SAMUEL LOWDEN, OF CHICAGO, ILLINOIS.

MANUFACTURE OF CEMENT.

SPECIFICATION forming part of Letters Patent No. 373,992, dated November 29, 1887.

Application filed July 23, 1886. Serial No. 208,850. (No specimens.)

*To all whom it may concern:*

Be it known that I, SAMUEL LOWDEN, a citizen of the United States, residing at the city of Chicago, in the county of Cook and State of Illinois, have invented a new and useful Improvement in the Manufacture of Cement, of which the following is a specification.

My invention is a new process of manufacturing cement of the kind commonly known as "Portland cement." This process embraces three main steps or stages, each consisting of two or more subordinate steps.

The first of these main steps or stages consists in taking of a clay consisting, essentially, of silica, alumina, and magnesia one (1) part, and of chalk (or a limestone which is eighty per cent. carbonate of lime) five (5) parts, by weight, crushing them, then washing and mixing them by passing them with water through a washing-mill, then collecting the mixture in settling-tanks and drawing off the supernatant water, then removing the deposit from the tanks and drying it, and afterward burning it in a kiln at a white heat to convert it into a hard clinker, and finally, after it has cooled, crushing or breaking this clinker into lumps of suitable size.

The second main step or stage of the process consists in taking chalk or limestone, first crushing it and then roasting it at a temperature of about 210° Fahrenheit to drive out the natural moisture.

The third main step or stage consists in mixing the products of the first and second divisions or steps in the proportions of about three (3) parts, by weight, of the product of the first, and one part, by weight, of the second, then submitting them to a French burr-mill or other pulverizer to reduce them to a fine powder, which constitutes the completed cement.

By thus dividing the process of manufacturing the cement into the three steps, two very important advantages are obtained as compared with the manufacture of Portland cement by either of the two processes known, respectively, as the "wet process" and the "dry process," heretofore commonly practiced, in both of which processes all the chalk, limestone, or carbonate of lime used is mixed at once with the clay, and the whole of the ingredients are burned together in a kiln at a red heat. These advantages both result from its enabling the cement to be manufactured in any of the many places where chalk or limestone of suitable quality is found, and consequently in many cases near where it is to be used, instead of, as heretofore, only in the few places where both the proper kind of clay and the chalk or limestone are found. One of these advantages is the avoidance of the deterioration to which the finished cement made by the old process is liable, when kept for a long time, especially when in a moist atmosphere or on a long sea voyage, for the product of the first stage of the process, which may be called the "cement nucleus," having been burned at a white heat, and being in lumps and very hard, may be kept for a long time without deterioration, and consequently transported a long way from the place of its manufacture to the place where the manufacture of the cement is to be completed and near where it is to be used. The other advantage results from the saving of one-fourth of the expense of transportation when only the cement nucleus is transported a long distance.

What I claim as my invention, and desire to secure by Letters Patent, is—

The within-described improvement in the process of manufacturing cement, embracing three separate main steps or stages, viz: first, taking about one part of clay and five of chalk, (or limestone,) crushing, washing, and mixing them, drying the washed mixture and burning it at a white heat, and crushing it into lumps; second, crushing separately and roasting at a temperature of about 210° Fahrenheit a quantity of limestone; third, mixing the products of the first and second steps or stages in the proportions of about three parts of the product of the first to one part of the product of the second, all substantially as herein described.

SAMUEL LOWDEN.

Witnesses:
D. H. HARVEY,
D. W. COTTER.